United States Patent Office 3,309,914
Patented Mar. 21, 1967

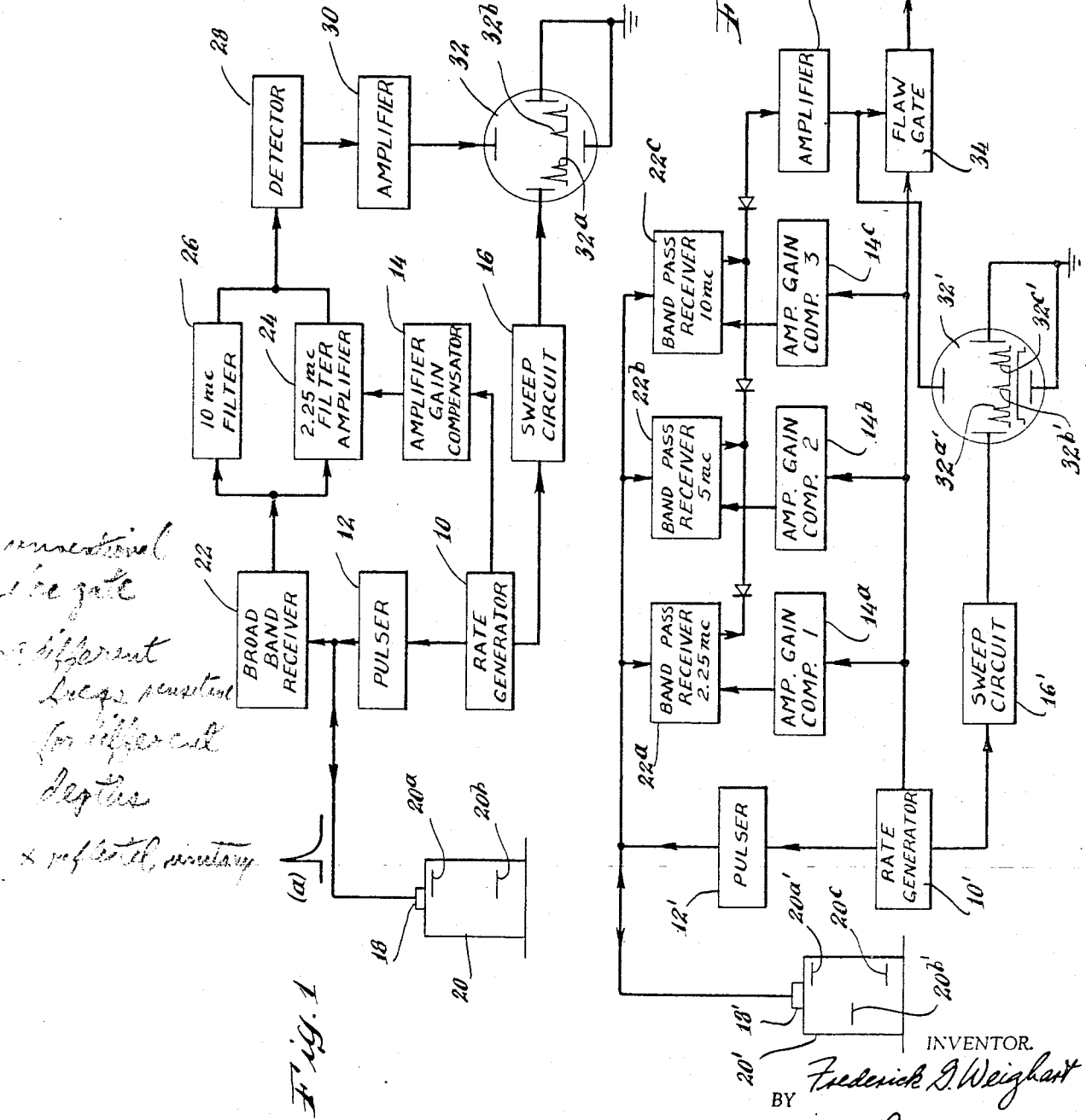

3,309,914
ULTRASONIC INSPECTION
Frederick G. Weighart, Brookfield, Conn., assignor to Automation Industries, Inc., El Segundo, Calif., a corporation of California
Filed Oct. 7, 1963, Ser. No. 314,277
12 Claims. (Cl. 73—67.9)

This invention relates to method and apparatus for ultrasonic inspection and, more particularly, to a system for simultaneous inspection at multiple frequencies.

Ultrasonic inspection is a well-known technique for examining materials to determine the presence of various types of defects. In this system of inspection, a suitable electro-mechanical transducer is energized by a pulse of radio frequency electrical energy and, in turn, produces a corresponding pulse of mechanical vibrations of ultrasonic frequency. Similar mechanical vibrations are induced in the object to be examined either by direct contact or by coupling through a suitable medium such as water. As the mechanical waves traverse the test object, they are reflected by various defects within the object, and the resulting "echo signals" are detected by means of either the same or a different transducer. The receiving transducer converts the echo signals to corresponding electrical signals which are then amplified and passed to suitable display apparatus such as a cathode ray oscilloscope or to a suitable gating and alarm system.

One of the problems inherent in prior art ultrasonic inspection techniques is that near surface defects are often difficult to detect. This is due to the fact that near to surface resolution is best achieved at relatively high ultrasonic frequencies. However, effective penetration of the test object is most advantageously accomplished at low frequencies. Accordingly, in highly attenuating materials, there is a direct conflict between the ability to detect deep lying defects and near to surface defects. For example, in the inspection of alloy steel turbine rotors the upper useful limit of frequency is about 5 mc. for sections two inches in thickness. At this frequency, however, the near to surface resolution is greatly impaired over what could be achieved at a substantially higher test frequency.

In order to overcome this difficulty, it has been proposed that a specimen be retested in several stages, using increasingly higher test frequencies and limiting the inspection depth proportionately. For example, an object such as the turbine rotor mentioned above might be successively inspected at 10 mc., 5 mc., and 2.25 mc. and the top third, middle third and lower third of the rotor examined in order. In a somewhat similar system which has been used commercially, two separate crystals and two receiver channels have been employed. The two frequencies are applied simultaneously but displayed on alternate sweeps of the cathode ray oscilloscope, one being displayed with inverted polarity for purposes of identification. It will be readily understood that these techniques have resulted in a higher degree of complexity for the individual conducting the ultrasonic test.

It is, accordingly, the primary object of this invention to provide improved method and apparatus for simultaneously testing an object for near to surface and deep lying defects. Other objects are to provide such method and apparatus utilizing a single ultrasonic transducer and a single display unit or alarm system. Other objects will be apparent from the following description, the appended claims and the figures of the attached drawings, wherein:

FIG. 1 illustrates, in block diagram form, apparatus in accordance with this invention; and FIG. 2 illustrates, in block diagram form, another embodiment of apparatus in accordance with this invention.

In the practice of this invention, a relatively broad band ultrasonic transducer is periodically energized by a pulse which contains a multiplicity of frequencies. The ultrasonic search unit, which may be the same or a different transducer, receives the echo signals from the test specimen. The various frequency components of the echo signals are then amplified and displayed sequentially as a function of time, the higher frequency component being first amplified and the lower frequency component being amplified thereafter in a sequence inversely related to their frequencies. In this manner, near surface defects are detected by use of the higher ultrasonic frequencies, thus insuring maximum resolution, while deep lying defects are detected by means of the more easily penetrating lower ultrasonic frequencies.

One form of apparatus for accomplishing the objects of this invention is illustrated in FIG. 1. A rate generator 10 supplies a periodic timing signal to a pulser 12, an amplifier gain compensator 14, and a sweep circuit 16. The signal from rate generator 10 serves as a trigger to the pulser 12 which is designed to produce a high voltage "spike" pulse as illustrated at (a). The leading edge of pulse (a) is very fast, for example, .02 microsecond. The trailing edge is exponential in shape and may be adjustable in time. A pulse of this type contains a wide spectrum of frequencies limited on the high side by the rise time and on the low side by the pulse rate. This pulse is applied to a transducer search unit 18. A broad band search unit should be used which is made of a material such as lithium sulfate having good response within the frequency range it is desired to test. The search unit 18 is in contact with a test specimen 20 which is illustrated as having interior defects 20a, 20b. The search unit 18 responds mechanically to the electrical pulse and produces a mechanical wave of ultrasonic frequencies which propagates through the test specimen 20 in the well-known manner and reflects from the discontinuities 20a, 20b as in conventional ultrasonic testing. A broad band receiver 22 is connected to amplify the signals received from the search unit 18. The receiver is selected to have a frequency response within the range it is desired to test. For example, in the disclosed embodiment the response of receiver 22 is from 1 to 10 mc. so that all signals received in this frequency range are amplified equally. The output of the broad band receiver 22 is connected to a 2.25 mc. filter amplifier 24 and a 10 mc. filter network 26. Each of filters 24 and 26 is tuned to its specified frequency. The outputs of filters 24, 26 are mixed and detected by a detector 28. The signal is then amplified by an amplifier 30 and applied to the vertical plates of a cathode ray oscilloscope 32.

The amplifier gain compensator 14 is a device of the type disclosed in my U.S. Patent 3,033,029 which issued May 8, 1962. Amplifier gain compensators such as disclosed in the patent are well-known items of equipment widely used in the ultrasonic testing field. The patented circuit applies gain control to an amplifier so as to amplify the input voltage signal at a ratio which increases with diminution of signal voltage due to travel of the pulse through the test material. Such circuits are familiarly known as "DAC," an acronym for "distance amplitude correction" and are commercially available.

In the circuit of FIG. 1 testing may be accomplished at two frequencies 10 and 2.25 mc. All the frequencies received by the transducer 18 are amplified in receiver 22 and passed to both filters. In highly attenuating steel, there will be practically no 10 mc. output from depths greater than one inch in the test specimen 20.

However, signals which are received corresponding to defects, such as defect 20a, which lie close to the surface will be passed by the filter network 26 and detector 28, amplified by amplifier 30, and will cause a defect signal 32a to appear on the screen of cathode ray oscilloscope 32. The amplifier gain compensator 14 is adjusted so that no 2.25 mc. signal is passed by filter amplifier 24 until a time period has lapsed which corresponds to a depth of approximately one half inch of test material. After this period, signals will be allowed to pass. In this manner, the 2.25 mc. signals from the near surface region of the test specimen 20 that would normally be present and obscuring the higher frequency signals are eliminated. Accordingly, the deep lying defect 20b creates an echo signal in the lower frequency range which passes the 2.25 mc. filter amplifier 24, the detector 28, and the amplifier 30 to provide a second defect signal 32b on the cathode ray oscilloscope 32.

It will be readily understood by those skilled in the art that a number of techniques may be employed for accomplishing the novel method of this invention. FIG. 1 illustrates an apparatus wherein a single broad band receiver is utilized to receive the output pulses from the search unit and tuned filters are employed to separate the output of the receiver into frequency components corresponding to inspection depths. In FIG. 2 there is illustrated another embodiment capable of accomplishing the objects of the invention. In the apparatus of FIG. 2 the rate generator 10' applies triggering impulses to a pulser 12', to a sweep circuit 16', and to amplifier gain compensators 14a, 14b, and 14c. Pulser 12' is designed to generate a pulse which is substantially similar to pulse (a) shown in FIG. 1. This pulse is applied to a similar broad band search unit 18' positioned in contact with a test specimen 20' having defects 20a', 20b' and 20c. The distinction between the circuit of FIG. 2 and that of FIG. 1 is that, in place of the broad band receiver, a series of parallel-connected band pass receivers 22a, 22b, and 22c are employed. It will be readily understood that the number of separate frequencies detected by the method of this invention is limited only by the requirements of the particular inspection problem. Accordingly, in FIG. 2 there is illustrated a system for utilizing three ultrasonic frequency components, each corresponding to a different range of defect depths. The echo signals received by the search unit 18' are passed to the tuned receivers 22a, 22b, 22c. A separate gain compensator 14a, 14b, or 14c is applied to each of the receivers. The control signals from the amplifier gain compensators are adjusted so that each of several preselected portions of the horizontal trace of cathode ray oscilloscope 32' corresponds to one of the frequencies to be employed. For example, in the three frequency system illustrated the amplitude gain compensator signals would be adjusted so that the high frequency receiver 22c would pass signals during the first portion of the trace. The intermediate frequency receiver 22b would pass signals during the second portion of the trace and the low frequency receiver 22a would pass signals during the last portion. The receiver outputs are rectified and amplified by a common amplifier 30'. These video signals are applied to the vertical deflection plates of the cathode ray oscilloscope 32' in parallel. Signals from a given depth will superimpose without appreciable phase distortion. The defect signals 32a', 32b', 32c' would then be displayed in the same fashion as those of FIG. 1. The control signals from the amplifier gain compensators may be either in the shape of rectangular "off-on" gates or complex curves to provide optimum band-pass characteristics. Selection of the shape of these control signals is well within the skill of those versed in the art and need not be discussed in detail. The operator of such an inspection device would not be concerned as to which channel is passing the information but only as to whether a flaw signal is generated from within the test specimen. In addition to the visual readout provided by the cathode ray oscilloscope 32', a flaw gate 34 and an alarm 36 may also be provided in accordance with well-known techniques in the ultrasonic inspection field.

It will be apparent to those skilled in the art that the invention described above has a wide range of useful applications, particularly in the field of ultrasonic inspection. Although only two embodiments of apparatus in accordance with this invention have been described and explained, it is not to be construed that the invention is in fact so limited. Many other variations and modifications will be apparent to those skilled in the art. It will be obvious that there need be no restriction of the number of frequencies employed in an inspection system of this type. Although the invention has been illustrated as employing a single transducer, the basic concept may be utilized with other techniques including separate sending and receiving search units. Furthermore, although the transducers are shown in contact with the test specimen, the invention is equally suited for use in immersion testing. Accordingly, it is to be understood that the foregoing description is illustrative only rather than limiting. This invention is limited only by the scope of the following claims.

What I claim as new and desire to secure by Letters Patent of the United States is:

1. The method of ultrasonic testing which comprises: inducing into a workpiece a pulse of mechanical wave energy, said pulse comprising a plurality of ultrasonic frequencies; detecting said mechanical wave energy after passage through at least a portion of said workpiece; converting said detected energy into corresponding electrical signals; selectively and sequentially amplifying preselected frequency components of said electrical signals; and utilizing the amplified components to indicate the physical characteristics of said workpiece.

2. The method of claim 1 wherein each of said frequency components is amplified at an independently variable level of amplification.

3. The method of ultrasonic testing which comprises: inducing into an entrant surface of a workpiece a pulse of mechanical wave energy, said pulse comprising a plurality of ultrasonic frequencies; detecting said mechanical wave energy at said entrant surface after reflection within said workpiece; converting said detected energy into corresponding electrical signals; selectively and sequentially amplifying preselected frequency components of said electrical signals, the amplification sequence being in inverse relationship to the selected frequency; and utilizing the amplified components to indicate the physical characteristics of said workpiece.

4. The method of claim 3 wherein said mechanical wave energy is induced and detected by the same electromechanical transducer.

5. Apparatus for ultrasonic testing which comprises: means for inducing into a workpiece a pulse of mechanical wave energy, said pulse comprising a plurality of ultrasonic frequencies; means for detecting said mechanical wave energy after passage through at least a portion of said workpiece and converting said detected energy into corresponding electrical signals; means for selectively and sequentially amplifying preselected frequency components of said electrical signals; and means for utilizing the amplified components to indicate the physical characteristics of said workpiece.

6. Apparatus for ultrasonic testing which comprises: rate generator means arranged to generate periodic electrical timing signals; pulser means connected to receive said timing signals and generate a multiple frequency electrical pulse in response to each timing signal; ultrasonic transducer means connected to receive each of said electrical pulses and generate an ultrasonic multiple frequency mechanical wave corresponding thereto, said transducer means being responsive to mechanical echo waves received during the intervals between said pulses to generate electrical echo signals corresponding thereto; broad band receiver means connected to receive and amplify substantially all of said electrical echo signals having frequencies within a preselected first range of frequencies; a plurality of filter means connected to receive the output from said receiver means, each filter means being adapted to pass a different frequency component; actuating means responsive to said timing signals and connected to actuate said filter means to sequentially pass different frequency components therefrom; and indicator means connected to receive the passed frequency components and provide a physical indication thereof.

7. The apparatus of claim 6 wherein each of said actuating means is an implifier gain compensator.

8. The apparatus of claim 7 wherein said indicator means is an oscilloscope.

9. The apparatus of claim 8 wherein the sweep circuit of said oscilloscope is connected to be controlled from the output of said rate generator means.

10. Apparatus for ultrasonic testing which comprises: rate generator means arranged to generate periodic electrical timing signals; pulser means connected to receive said timing signals and generate a multiple frequency electrical pulse in response to each timing signal; ultrasonic transducer means connected to receive each of said electrical pulses and generate an ultrasonic multiple frequency mechanical wave corresponding thereto, said transducer means being responsive to mechanical echo waves received during the intervals between said pulses to generate electrical echo signals corresponding thereto; a plurality of band pass receiver means, each connected to receive said electrical echo signals and amplify only those frequencies within a preselected different frequency range; a plurality of amplifier gain compensator means, each operable from said rate generator means and connected to sequentially activate a different one of said band pass receiver means; and indicator means connected to receive the passed frequencies from said band pass receiver means and provide a physical indication therof.

11. The apparatus of claim 10 wherein said indicator means is an oscilloscope.

12. The apparatus of claim 11 wherein the sweep circuit of said oscilloscope is connected to be controlled from the output of said rate generator means.

References Cited by the Examiner

UNITED STATES PATENTS

| 2,755,662 | 7/1956 | Swengel | 73—67.6 |
| 3,033,029 | 5/1962 | Weighart | 73—67.8 |

FOREIGN PATENTS 812,332   4/1959   Great Britain.

RICHARD C. QUEISSER, *Primary Examiner.*

C. A. RUEHL, *Assistant Examiner.*